US009735422B2

(12) United States Patent
Hayashi et al.

(10) Patent No.: US 9,735,422 B2
(45) Date of Patent: Aug. 15, 2017

(54) LITHIUM ION SECONDARY CELL

(75) Inventors: Keiichi Hayashi, Kariya (JP); Manabu Miyoshi, Kariya (JP); Takayuki Hirose, Kariya (JP); Hitotoshi Murase, Kariya (JP); Hideyuki Morimoto, Kiryu (JP); Shin-ichi Tobishima, Kiryu (JP)

(73) Assignee: NATIONAL UNIVERSITY CORPORATION GUNMA UNIVERSITY, Maebashi-shi, Gunma (JP)

( * ) Notice: Subject to any disclaimer, the term of this patent is extended or adjusted under 35 U.S.C. 154(b) by 301 days.

(21) Appl. No.: 14/122,973

(22) PCT Filed: May 10, 2012

(86) PCT No.: PCT/JP2012/003054
§ 371 (c)(1),
(2), (4) Date: Nov. 27, 2013

(87) PCT Pub. No.: WO2012/164834
PCT Pub. Date: Dec. 6, 2012

(65) Prior Publication Data
US 2014/0106226 A1 Apr. 17, 2014

(30) Foreign Application Priority Data

May 30, 2011 (JP) ................. 2011-120110

(51) Int. Cl.
*H01M 4/36* (2006.01)
*C01G 49/06* (2006.01)
(Continued)

(52) U.S. Cl.
CPC ............. *H01M 4/364* (2013.01); *B82Y 30/00* (2013.01); *C01G 49/06* (2013.01); *H01M 4/485* (2013.01);
(Continued)

(58) Field of Classification Search
None
See application file for complete search history.

(56) References Cited

U.S. PATENT DOCUMENTS

2004/0175618 A1 9/2004 Inoue et al.
2007/0243469 A1 10/2007 Kim et al.
(Continued)

FOREIGN PATENT DOCUMENTS

JP 07-282844 A 10/1995
JP 10-233215 A 9/1998
(Continued)

OTHER PUBLICATIONS

JP2010-003642A—Machine translation.*
(Continued)

*Primary Examiner* — Sarah A Slifka
*Assistant Examiner* — Haroon S Sheikh
(74) *Attorney, Agent, or Firm* — Sughrue Mion, PLLC

(57) ABSTRACT

Provided is a negative-electrode active material, which is capable of constituting a lithium ion secondary cell exhibiting excellent cell characteristics.

The negative-electrode active material for a lithium ion secondary cell of the invention includes a mixed material of silicon oxide particles composed of silicon oxide and rod-shaped iron oxide particles composed of iron oxide. It is preferable to use iron oxide particles having a plurality of pores in a surface, and an electrode reaction is effectively carried out.

10 Claims, 7 Drawing Sheets

(51) Int. Cl.
H01M 4/485 (2010.01)
H01M 4/525 (2010.01)
B82Y 30/00 (2011.01)
H01M 10/0525 (2010.01)
H01M 4/02 (2006.01)

(52) U.S. Cl.
CPC ......... *H01M 4/525* (2013.01); *C01P 2002/50* (2013.01); *C01P 2002/72* (2013.01); *C01P 2004/03* (2013.01); *C01P 2004/16* (2013.01); *C01P 2004/54* (2013.01); *C01P 2004/62* (2013.01); *C01P 2006/12* (2013.01); *C01P 2006/14* (2013.01); *H01M 10/0525* (2013.01); *H01M 2004/021* (2013.01)

(56) References Cited

U.S. PATENT DOCUMENTS

| 2011/0070495 | A1 | 3/2011 | Ban et al. | |
|---|---|---|---|---|
| 2011/0159368 | A1* | 6/2011 | Hirose | H01M 4/134 429/219 |

FOREIGN PATENT DOCUMENTS

| JP | 2003-132888 A | 5/2003 |
|---|---|---|
| JP | 2004-158205 A | 6/2004 |
| JP | 2004-265806 A | 9/2004 |
| JP | 2004-349253 A | 12/2004 |
| JP | 2005-243431 A | 9/2005 |
| JP | 2006-172901 A | 6/2006 |
| JP | 2006-294469 A | 10/2006 |
| JP | 2007-031233 A | 2/2007 |
| JP | 2007-287670 A | 11/2007 |
| JP | 2008-176981 A | 7/2008 |
| JP | 2008-262829 A | 10/2008 |
| JP | 2010-003642 A | 1/2010 |
| JP | 2010-092834 A | 4/2010 |
| JP | 2011-34836 A | 2/2011 |
| JP | 2011-60558 A | 3/2011 |

OTHER PUBLICATIONS

JP 2008-262829A—Machine translation.*
JP 2005-243431A—Machine translation.*
Communication dated Nov. 27, 2014 from The European Patent Office in counterpart European Patent Application No. 12792077.5.
Poizot P et al., "Nano-sized transition metal oxides as a negative electrode materials for lithium ion batteries", vol. 407, 4 pages total, Sep. 28, 2000, XP009087548.
Liu H et al., "Electrochemical performance for alpha-Fe2O3 nanorods as anode material for lithium-ion cells", 2009, 4 pages total.

* cited by examiner

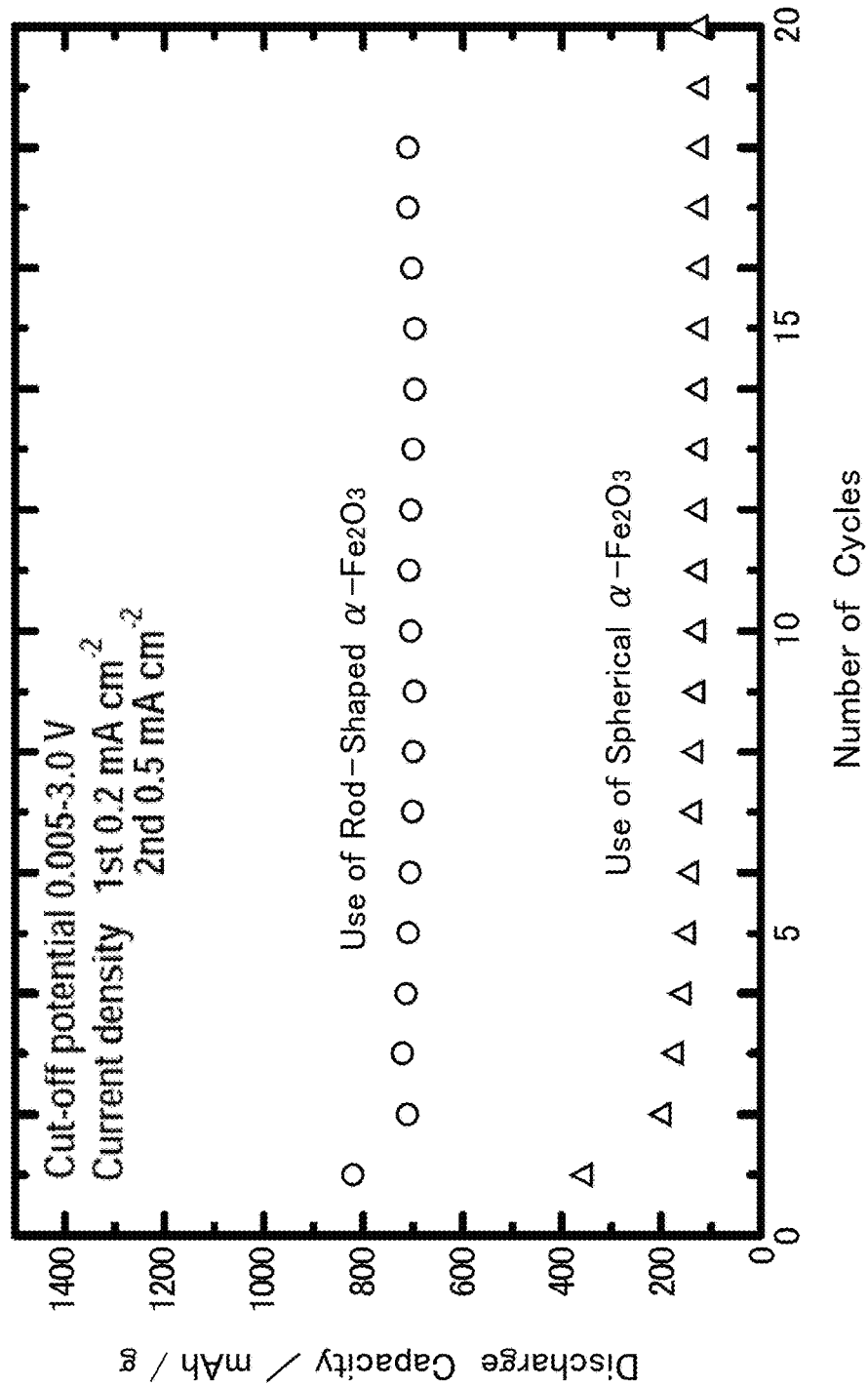

LITHIUM ION SECONDARY CELL

CROSS REFERENCE TO RELATED APPLICATIONS

This application is a National Stage of International Application No. PCT/JP2012/003054, filed on May 10, 2012, which claims priority from Japanese Patent Application No. 2011-120110, filed on May 30, 2011, the contents of all of which are incorporated herein by reference in their entirety.

TECHNICAL FIELD

The present invention relates to a material that is used for a negative electrode of a lithium ion secondary cell, and a lithium ion secondary cell using the material.

BACKGROUND ART

A secondary cell such as a lithium ion secondary cell has a small size and a large capacity, and thus has been used in a wide range of fields such as a cellular phone and a notebook PC. The performance of the lithium ion secondary cell is determined by materials of a positive electrode, a negative electrode, and an electrolyte, which constitute the secondary cell. Among these, research and development of an active material that is included in an electrode has been actively performed. Currently, a carbon-based material such as graphite may be exemplified as a negative-electrode active material that is generally used. A carbon negative electrode using graphite and the like as the negative-electrode active material has an intercalation reaction. Therefore, the carbon active material has satisfactory cycle characteristics, but high capacity is difficult to achieve. Accordingly, a silicon-based material such as silicon and silicon oxide, which has capacity higher than that of carbon, has been examined.

The silicon-based material has high capacity, 1000 mAh/g or more, by alloying with lithium. However, when the silicon-based material such as silicon and silicon oxide is used as the negative-electrode active material, it is known that the negative-electrode active material is expanded and contracted due to a charge and discharge cycle, and thus the volume of the negative-electrode active material varies. When the negative-electrode active material is expanded or contracted, the following problems occur. A load is applied to a binding agent that plays a role of maintaining the negative-electrode active material to a current collector, and thus adhesiveness between the negative-electrode active material and the current collector decreases, or a conduction path inside the electrode is broken, and as a result, capacity significantly decreases. In addition, a stress occurs in the negative-electrode active material due to repetition of expansion and contraction, and the negative-electrode active material becomes fine, and thus the negative-electrode active material is detached from the electrode. Due to these various kinds of problems, there is a problem in that the cycle characteristics become poor.

Therefore, as the silicon-based material, use of silicon oxides ($SiO_x$: x approximately satisfies an expression 0.5× 1.5) has been examined. It is known that when being heat-treated, SiO is discomposed into Si and $SiO_2$. This is called a disproportional reaction, and in a case of uniform solid silicon monoxide SiO in which a ratio of Si and O is approximately 1:1, the silicon monoxide is separated into two phases including a Si phase and a $SiO_2$ phase due to an internal reaction of a solid. The Si phase that is obtained by the separation is very fine. In addition, the $SiO_2$ phase that covers the Si phase has a function of suppressing decomposition of an electrolytic solution. Accordingly, a problem of volume variation remains still, but a secondary cell using the negative-electrode active material composed of the $SiO_x$ decomposed into the Si phase and the $SiO_2$ phase is excellent in cycle characteristics.

In addition, as the negative-electrode active material, use of iron oxide, which has low toxicity and is abundant in resources and is not expensive, has been suggested. With regard to the iron oxide ($Fe_2O_3$), a reaction progresses to a transition region due to intercalation of Li. At this time, a theoretic capacity is 1007 mAh/g, but at the first cycle, actual charge and discharge efficiency is 70%, and thus sufficient electrode performance may not be exhibited. In addition, in the iron oxide, there is also a problem in that a reaction speed of a cell is slow.

An electrode that uses the negative-electrode active materials in combination is disclosed in Patent Literature 1. Patent Literature 1 discloses an electrode provided with a current collector and a metal oxide-containing layer provided to the current collector. The metal oxide-containing layer contains metal oxide particles including a metal oxide and $SiO_x$ (0≤x≤2).

In Patent Literature 1, the metal oxide particles and $SiO_x$ are mixed in, excellent cycle characteristics are obtained. As a reason for obtaining the effect, Patent Literature 1 discloses the following reasons. When metal oxide particles are included, a stress that occurs due to volume expansion of $SiO_x$, which accompanies intercalation and deintercalation of lithium ions, is mitigated, and thus deformation of the metal oxide-containing layer or peeling from the current collector is suppressed, whereby excellent cycle characteristics are obtained. In addition, Patent Literature 1 discloses that not only the $SiO_x$ but also the metal oxide contribute to the intercalation and deintercalation of the lithium ions, and thus electric capacity may be improved.

CITATION LIST

Patent Literature

Patent Literature No. 1: Japanese Unexamined Patent Publication (KOKAI) Gazette No. 2010-3642 A

SUMMARY OF THE INVENTION

Problem to be Solved by the Invention

The electrode disclosed in Patent Literature 1 is not an electrode which includes a general active material layer containing a positive-electrode active material, a conductive auxiliary material, and a binding agent that binds the positive-electrode active material and the conductive auxiliary material. For example, in examples, a metal oxide-containing layer which contains $SiO_2$, FeO, $Fe_2O_3$, and the like is formed on a surface of copper foil that is a current collector by using an arc ion plating device provided with a Fe target and a Si target. According to this method, fine metal oxide particles (an average particle size is 1 to 50 nm) are formed on the surface of the current collector. However, when using a PVD method such as the arc ion plating, a large scale device that controls a vacuum system is necessary, and thus this leads to an increase in the cost. In addition, it is considered that the fine metal oxide particles are present on the surface of the current collector in a very dense manner.

Accordingly, it is considered that conductivity decreases due to a contact resistance between particles, and thus there is a disadvantage with regard to the electrode.

The invention has been made in consideration of the above-described circumstances, and an object thereof is to provide a new negative-electrode active material capable of constituting a lithium ion secondary cell exhibiting excellent cell characteristics.

Means for Solving the Problem

The present inventors have given attention to the following fact. In other words, when silicon oxide which has been used as a negative-electrode active material in the related art, and iron oxide having a specific shape are mixed and used, a volume variation of a negative-electrode active material layer, which occurs during charge and discharge, has a tendency to be mitigated. The present inventors have further developed this achievement, and have accomplished the following invention.

In other words, according to an aspect of the invention, there is provided a negative-electrode active material for a lithium ion secondary cell. The negative-electrode active material includes a mixed material of silicon oxide particles composed of silicon oxide and rod-shaped iron oxide particles composed of iron oxide.

In the negative-electrode active material for the lithium ion secondary cell of the related art, when only substituting a part of the silicon oxide powder with an iron oxide powder, there is an effect of reducing an adverse effect which occurs due to a volume variation of the silicon oxide particles. However, a significant effect may not be obtained with the substitution alone. In addition, the iron oxide particles are materials in which a little variation also occurs to a certain degree along with the charge and discharge. The negative-electrode active material for the lithium ion secondary cell of the invention contains iron oxide particles which are composed of the iron oxide and has a specific shape in combination with the silicon oxide particles composed of the silicon oxide, and thus the following effect may be exhibited.

Spherical particles are also present in the iron oxide, but a shape of the iron oxide particles, which are essentially included in the negative-electrode active material for the lithium ion secondary cell of the invention, is a rod shape. When comparing the rod-shaped particles and the spherical particles which have the same volume, the rod-shaped particles have a flat central portion, and thus the thickness thereof is small. Further, the rod-shaped particles have a tendency to be disposed in parallel with a surface of the current collector. Therefore, when employing the rod-shaped iron oxide particles, a volume variation in a thickness direction of the electrode is mitigated. In addition, it is easy for the silicon oxide particles to move on the surface of the rod-shaped iron oxide particles with which the silicon oxide particles come into contact, and thus the powder is rearranged along with the volume variation of the silicon oxide particles which occurs during charge and discharge, and thus the volume variation is mitigated. After the rearrangement, the powder enters a closed state, and thus not only the mitigation of the volume variation but also improvement in conductivity may be expected.

In addition, when the iron oxide particles have a rod shape, a satisfactory contact state in relation to contact between spherical particles may be obtained, and thus an internal resistance may be reduced.

Furthermore, it is preferable that the iron oxide particles have a plurality of pores in a surface. When the plurality of pores is present, a specific surface increases, and thus a surface area contributing to an electrode reaction increases. In addition, an electrolytic solution is impregnated into the plurality of pores, and diffuses from the surface of the pores. At this time, since the iron oxide particles have the rod shape, a distance between the pores positioned to orient in a thickness direction is shorter than that a distance between spherical particles. In other words, in the rod-shaped iron oxide particles having the plurality of pores in the surface, a diffusion distance is short. Accordingly, in the negative-electrode active material for the lithium ion secondary cell of the invention, which uses the iron oxide particles using a plurality of pores in a surface, an electrode reaction may be effectively carried out.

As described above, in the iron oxide, a reaction speed of a cell reaction is late. However, in the negative-electrode active material for the secondary cell of the invention, since the iron oxide particles which have a rod shape and have the plurality of pores in a surface are used, it is assumed that a reaction speed comparable to silicon oxide may be obtained.

Advantageous Effects of the Invention

The negative-electrode active material for the lithium ion secondary cell of the invention is effective for improvement in cell characteristics such as a charge and discharge capacity and cycle characteristics of the lithium ion secondary cell.

BRIEF DESCRIPTION OF THE DRAWINGS

FIG. 8 is a graph illustrating cycle characteristics of the lithium ion secondary cell using the negative-electrode active material, which contains an iron oxide powder having a different shape, for the lithium ion secondary cell.

DESCRIPTION OF EMBODIMENTS

Figure 1:
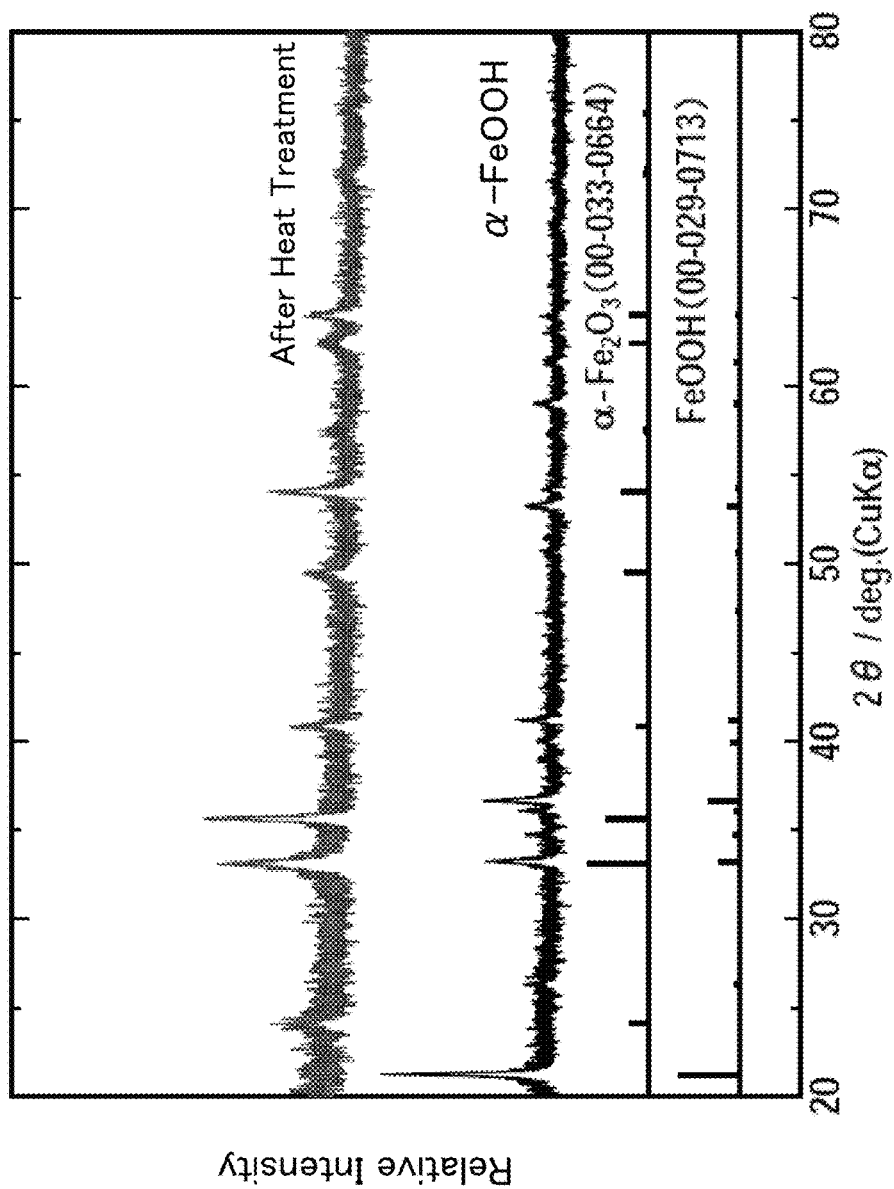
FIG. 1 illustrates X-ray diffraction patterns of an iron oxide powder used for a negative-electrode active material for a lithium ion secondary cell of the invention, and a precursor of the iron oxide powder.

Hereinafter, embodiments for carrying out a negative-electrode active material for the lithium ion secondary cell of the invention will be described. In addition, a numerical range "a to b" described in this specification includes the lower limit a and the upper limit b unless otherwise stated. In addition, the numerical range may be constituted by an arbitrary combination of the upper limit, the lower limit, and numerical values exemplified in examples.

<Negative-Electrode Active Material for Lithium Ion Secondary Cell>

The negative-electrode active material for the lithium ion secondary cell of the invention includes a mixed material of silicon oxide particles composed of silicon oxide and iron oxide particles composed of iron oxide. Hereinafter, the silicon oxide particles and the iron oxide particles will be described. In addition, in this specification, these may be mentioned as silicon oxide powder and an iron oxide powder, but all of these powders represent aggregates of particles.

Specifically, it is preferable that the iron oxide particles are composed of iron oxide, specifically, ferric oxide ($Fe_2O_3$) capable of intercalating and deintercalating lithium. In the ferric oxide, crystal structures such as an $\alpha$-phase, a $\beta$-phase, and a $\gamma$-phase different from each other are present. However, it is preferable to use iron oxide ($\alpha$-$Fe_2O_3$ particles) composed of $\alpha$-$Fe_2O_3$ in consideration of a general crystal structure, ease of availability, and low price. In addition, it is needless to say that an iron oxide powder including two or more kinds of ferric oxides having structures different from each other may be used.

The iron oxide particles have a rod shape. When specifically defining the rod shape, it is preferable that an aspect ratio (that is, average length/average diameter) that is defined as a ratio of a length to a width of a circumscribed rectangle of a particle when seen in a plan view be 2 or more, 3 or more, or 4 or more. Although not particularly specified, the upper limit of the aspect ratio is preferably 10 or less, 8.5 or less, or 5 or less. Specifically, when an average length of a particle in a longitudinal direction may be 0.4 μm to 0.7 μm, and an average diameter of a particle in a short direction may be 0.085 μm to 0.17 μm. In addition, in this specification, with regard to the measurement of dimensions of a particle, the dimensions are values by measurement from a microphotograph that is obtained by observation using various kinds of microscopes. An average value is calculated by averaging a plurality of measured values.

In addition, the iron oxide particles may have a plurality of pores in a surface thereof. It is assumed that these pores are opened in the surface of the particles, and are opened to be approximately perpendicular to the surface of the particles. The fact that the iron oxide particles have the plurality of pores may be confirmed, for example, by measuring a specific area. There is no particular limitation to the specific surface area. However, it is considered that when the specific surface area is 30 $m^2/g$ or more, pores are present in rod-shaped iron oxide particles having dimensions suitable for use as a negative-electrode active material, and there is no problem. The specific surface area of the iron oxide particles is preferably 80 $m^2/g$ or more or 100 $m^2/g$ or more. As the value of the specific surface area increases, a reaction area increases, and thus efficiency of a cell reaction is further improved. On the other hand, the specific surface area may be set to 1000 $m^2/g$ or less or 600 $m^2/g$ or less so as to suppress an excessive reaction with an electrolytic solution. In addition, there is also no particular limitation, but a pore volume is preferably 0.08 $cm^3/g$ or more or 0.10 $cm^3/g$ or more. From the viewpoint of increasing a filling rate of an active material (a density of iron-based oxide in an active material layer), the pore volume of the iron oxide particles is preferably 1.0 $cm^3/g$ or less or 0.5 $cm^3/g$ or less.

In addition, in this specification, as the specific surface area and the pore volume, values obtained by measuring the iron oxide powder by a BET method are employed.

Next, an example of a method of manufacturing the iron oxide particles having a plurality of pores will be described. However, there is no limitation to the method as long as the iron oxide particles may be obtained. In addition, a commercially available product may also be used.

For example, $Fe_2O_3$ may be manufactured by heat-treating FeOOH (iron oxyhydroxide). In a case of obtaining $\alpha$-$Fe_2O_3$, a precursor such as $\alpha$-FeOOH may be prepared, and in a case of obtaining $\gamma$-$Fe_2O_3$, a precursor such as $\gamma$-FeOOH may be used. At this time, an exterior shape of FeOOH does not vary before and after the heat treatment, and thus when preparing a rod-shaped FeOOH powder, a rod-shaped $Fe_2O_3$ powder may be obtained. The rod-shaped FeOOH is commercially available, but the rod-shaped FeOOH is easily synthesized as a precipitate obtained by aging an aqueous solution such as iron chloride. It is preferable that the heat treatment be carried out for 1 hour or more or 1.5 hours to 10 hours at 150° C. to 500° C. or 250° C. to 400° C., and may be carried out 2 hours to 5 hours. When the heat treatment is carried out, a dehydration reaction due to thermal decomposition occurs in FeOOH, but pores are formed as a result of dehydration from a surface. When the heat treatment is carried out in the above-described temperature range, the rod-shaped $Fe_2O_3$ particles having a plurality of pores may be easily obtained from the rod-shaped FeOOH particles. As the heat treatment temperature is high, the dehydration reaction sufficiently progresses, and thus pores are easily formed, and the specific surface area increases. However, when the heat treatment temperature is too high, on the contrary, the specific surface area has a tendency to decrease. This is because clogging of the pores occurs. In addition, there is not particular limitation to a heat treatment atmosphere, and thus the heat treatment may be carried out in an oxygen-containing atmosphere, for example, in the air.

As the silicon oxide particles, a silicon oxide powder, which has been used as a negative-electrode active material in the related art, may be used. Hereinafter, a configuration of the silicon oxide particles (powder) that are optimal for the negative-electrode active material for the lithium ion secondary battery of the invention will be described.

The silicon oxide particles may include a $SiO_2$ phase and a Si phase. An effect of each of the phases is as described above. Accordingly, the silicon oxide particles may be composed of silicon oxide expressed by $SiO_n$ ($0.3 \leq n \leq 1.6$). When n is less than 0.3, the percentage occupied by the Si phase increases, and thus a volume variation during charge and discharge increases too much, and the cycle characteristics decrease. In addition, when n exceeds 1.6, the percentage of the Si phase decreases, and an energy density decreases. The range of n is preferably $0.5 \leq n \leq 1.5$ and more preferably $0.7 \leq n \leq 1.2$.

In general, it is said that in an oxygen free state, almost all of SiO becomes disproportionate at 800° C. or more, and is separated into two phases. Specifically, when a heat treatment is carried out with respect to a raw material silicon oxide powder containing a non-crystalline SiO powder in an inert atmosphere such as in vacuum and in an inert gas at 800° C. to 1200° C. for 1 hour to 5 hours, a powder composed of SiO particles including two phases of the non-crystalline $SiO_2$ phase and the crystalline Si phase may be obtained.

When the silicon oxide powder including the non-crystalline SiO powder is milled, SiO becomes disproportionate and is separated into two phases. It is considered that apart of mechanical energy during the milling contributes to chemical atomic diffusion at a solid-phase interface of particles, and thus the $SiO_2$ phase, the Si phase, and the like are generated. The silicon oxide powder may be milled under an inert gas atmosphere such as in vacuum and in an argon gas by using a V-type mixer, a ball mill, an attritor, a jet mill, a vibration mill, a high-energy ball mill, and the like. The disproportionation of the silicon oxide may be further promoted by further carrying out a heat treatment after milling.

It is preferable that the silicon oxide powder be composed of approximately spherical particles. From the viewpoint of charge and discharge characteristics of the lithium ion secondary cell, the smaller an average particle size of the silicon oxide powder, the more preferable. However, when the average particle size is too small, coarse particles are formed due to aggregation during formation of a negative electrode, and thus the charge and discharge characteristics of the lithium ion secondary cell may decrease in some cases. Therefore, the average particle size of the silicon oxide powder may be in a range of 5 μm to 20 μm.

In addition, the silicon oxide particles may include a coating layer formed from a carbon material on a surface thereof. The coating layer formed from the carbon material applies conductivity to the silicon oxide particles and prevents a reaction with hydrofluoric acid that is generated when the silicon oxide particles and components of an electrolytic solution are decomposed, and thus cell characteristics of the lithium ion secondary cell are improved. As the carbon material of the coating layer, natural graphite, artificial graphite, cokes, mesophase carbon, vapor-phase growth carbon fiber, pitch-based carbon fiber, PAN-based carbon fiber, and the like may be used. In addition, the silicon oxide and a precursor of the carbon material may be mixed and baked to form the coating layer. As the precursor of the carbon material, organic compounds such as sugars, glycols, polymers including polypyrrole, acetylene black, which can be changed to a carbon material by baking, may be used. In addition, the coating layer may also be formed using a mechanical surface fusion treatment method such as mechano-fusion, and a deposition method such as CVD.

The negative-electrode active material for the lithium ion secondary cell of the invention contains a mixture of the silicon oxide particles and the iron oxide particles. Stability of the cycle characteristics are improved along with an increase of a mixed amount of the iron oxide particles, but the capacity has a tendency to decrease. Therefore, a mixing ratio between the silicon oxide particles and the iron oxide particles may be appropriately determined depending on characteristics that are demanded for the lithium ion secondary cell. For example, when the entirety of the mixed material is set to 100% by mass, the iron oxide particles may be contained in 5% by mass or more, 10% by mass or more, 30% by mass or more, or 40% by mass or more to improve the cycle characteristics. On the other hand, when the entirety of the mixed material is set to 100% by mass, the iron oxide particles may be contained in 1% by mass or more, 3% by mass or more, 5% by mass or more, or 10% by mass or more to obtain high-capacity lithium ion secondary cell. However, when the added amount of the iron oxide particle is excessive, charge and discharge capacity decreases, and thus the iron oxide particles may be contained in 25% by mass or less, 23% by mass or less, 20% by mass or less, or 15% by mass or less when the entirety of the mixed material is set to 100% by mass. Particularly, when the entirety of the mixed material is set to 100% by mass, the iron oxide particles may be contained in 5% by mass or more or 10% by mass or more, and 25% by mass or less or 15% by mass or less to obtain a lithium ion secondary cell having sufficient capacity and cycle characteristics. In any case, it is preferable that the remainder is substantially composed of silicon oxide particles alone. The silicon oxide particles may have the coating layer as described above.

<Negative-Electrode for Lithium Ion Secondary Cell>

The negative electrode of the lithium ion secondary cell of the invention includes a mixed material of the silicon oxide particles and the iron oxide particles as a negative-electrode active material, and includes a current collector and an active material layer that is bound onto the current collector. The active material layer may be prepared by applying slurry, which is obtained by adding and mixing a negative-electrode active material, a conductive auxiliary agent, a binder resin, and an appropriate amount of organic solvent as necessary, on the current collector by a method such as a roll coating method, a dip coating method, a doctor blade method, a spray coating method, and a curtain coating method, and by curing the binder resin.

As a shape of the current collector, a shape such as a metallic mesh, metallic foil, and a metallic plate may be employed. However, there is no particular limitation as long as the shape is determined depending on a purpose. As the current collector, for example, copper foil or aluminum foil may be appropriately used.

In addition, the negative-electrode active material essentially includes a mixed material of the silicon oxide particles and the iron oxide particles, and may contain an additional negative-electrode active material. As the additional negative-electrode active material, for example, a carbon-based negative-electrode active material may be exemplified.

The conductive auxiliary agent is added to increase conductivity of an electrode. As the conductive auxiliary agent, carbon black, graphite, acetylene black (AB), Ketjen black (KB), a vapor grown carbon fiber (VGCF) which are carbonaceous fine particles may be added alone or in combination of two or more kinds thereof. There is no particular limitation to a used amount of the conductive auxiliary agent. However, for example, the used amount may be set to approximately 20 parts by mass to 100 parts by mass on the basis of 100 parts by mass of an active material. When the amount of the conductive auxiliary agent is less than 20 parts by mass, an efficient conduction path is not formed, and when the amount exceeds 100 parts by mass, moldability of an electrode deteriorates and an energy density decreases. In addition, in a case of using the silicon oxide particles having the coating layer formed from a carbon material, the added amount of the conductive auxiliary agent may be reduced, or the conductive auxiliary agent may not be added.

The binder resin is used as a binding agent that binds the active material and the conductive auxiliary agent to the current collector. It is necessary for the binder resin to bind the active material and the like with an amount as less as possible, and when the entirety of the negative-electrode active material, the conductive auxiliary agent, the binder, and the resin is set to 100% by mass, the amount of the binder is preferably 0.5% by mass to 50% by mass. When the amount of the binder resin is less than 0.5% by mass, moldability of the electrode decreases, and when the amount exceeds 50% by mass, the energy density of the electrode decreases. In addition, examples of the binder resin include a fluorine-based polymer such as polyvinylidene fluoride (PVDF) and polytetrafluoroethylene (PTFE), rubber such as styrene butadiene rubber (SBR), an imide-based polymer such as polyimide, polyamideimide, an alkoxysilyl group-containing resin, polyacrylic acid, polymethacrylic acid, polyitaconic acid, and the like. In addition, a copolymer of acrylic acid and an acid monomer such as methacrylic acid, itaconic acid, fumaric acid, and maleic acid may be used. Among these, a resin such as polyacrylic acid that contains a carboxyl group is particularly preferable. In addition, the more the content of the carboxyl group is, the more the resin is preferable.

In the lithium ion secondary cell of the invention, it is preferable that the negative electrode is pre-doped with lithium. When doping lithium to the negative electrode, for example, an electrode forming method in which a half cell is assembled by using metal lithium for a counter electrode, and lithium is electrochemically doped, and the like may be used. A doped amount of lithium is not particularly limited, and lithium may be pre-doped in a theoretic capacity or more.

In addition, when the lithium is doped or after first charge of the lithium ion secondary cell of the invention, an oxide-based compound expressed by $Li_xSi_yO_z$ ($0 \leq x \leq 4$, $0.3 \leq y \leq 1.6$, and $2 \leq z \leq 4$) may be contained in the $SiO_2$ phase that is included in the negative-electrode active material. Examples of $Li_xSi_yO_z$ include $SiO_2$ (x=0, y=1, and z=2), $Li_2SiO_3$ (x=2, y=1, and z=3), $Li_4SiO_4$ (x=4, y=1, and z=4), and the like. For example, the $Li_4SiO_4$ (x=4, y=1, and z=4) is generated by the following reaction, and coulombic efficiency is calculated as approximately 77%.

$$2SiO+8.6Li^++8.6e^- \rightarrow 1.5Li_{4.4}Si+\tfrac{1}{2}Li_4SiO_4$$

In addition, when the reaction is stopped midway, like the following reaction, both of the $Li_2SiO_3$ (x=2, y=1, and z=3), $Li_4SiO_4$ (x=4, y=1, and z=4) are generated, and coulombic efficiency in this case is calculated as approximately 77%.

$$2SiO+7.35Li^++7.35e^- \rightarrow 1.42Li_{4.4}Si+\tfrac{1}{3}Li_2SiO_3+\tfrac{1}{4}Li_4SiO_4$$

The $Li_4SiO_4$ that is generated by the above-described reaction is an inert material that does not take part in an electrode reaction during charge and discharge, and has a function of mitigating a volume variation of the active material during charge and discharge. Accordingly, in a case where the oxide-based compound expressed by $Li_xSi_yO_z$ is contained in the $SiO_2$ phase, the cycle characteristics of the lithium ion secondary cell of the invention are further improved.

Further, in the negative electrode for the lithium ion secondary cell of the invention, when the lithium ion secondary cell is charge and discharged to a conversion region of the iron oxide particles, the coulombic efficiency may be improved to 77% or more. From extensive studying, the present inventors have found that at a charge and discharge test in which charge and discharge is carried out at a low current density, capacity increases, and the coulombic efficiency becomes approximately 93%. This reason is not clear, but it is assumed that zero-valent Fe that is generated in the transition region plays a role of a catalyst with respect to a cell reaction of the silicon oxide particles. Accordingly, in the lithium ion secondary cell using the negative electrode for the lithium ion secondary cell of the invention, in a case where the transition region of the iron oxide particles is also specifically defined, charge and discharge may be carried out by setting a final voltage to 0.005 V or 0 V in terms of a lithium reference potential Lithium Ion Secondary Cell The lithium ion secondary cell of the invention, which uses the negative electrode, may use a positive electrode, an electrolyte, and a separator which are not particularly limited and are known in the related art. The positive electrode may be an electrode that is capable of being used in a lithium ion secondary cell. The positive electrode includes a current collector, and a positive electrode active material layer that is bound onto the current collector. The positive-electrode active material layer includes a positive-electrode active material and a binder, and may also include a conductive auxiliary agent. The positive-electrode active material, the conductive auxiliary agent, and the binder are not particularly limited, and may be materials capable of being used in the lithium ion secondary cell.

Examples of the positive-electrode active material include lithium-containing metal oxides that contain $LiCoO_2$, $LiNi_pCo_qMn_rO_2$ ($0<p<1$, $0+p<q<1-p$, $0+(p+q)<r<1-(p+q)$), $Li_2MnO_2$, $Li_2MnO_3$, $LiNi_sMn_tO_2$ ($0<s<1$, $0+s<t<1-s$), $LiFePO_4$, and $Li_2FeSO_4$ as a basic component, or a solid solution material that contains one or more kinds of these components. Preferably, $LiCoO_2$, $LiNi_{1/3}CO_{1/3}Mn_{1/3}O_2$, $Li_2MnO_2$, S, and the like may be exemplified. As a positive electrode active material that contains S, simple sulfur substance (S), a sulfur-modified compound in which sulfur is introduced to an organic compound such as polyacrylonitrile, and the like may be used. However, these materials do not contain lithium that serves as an electrolyte ion, and thus it is necessary for the negative-electrode active material or the positive electrode active material to be doped (pre-doped) with lithium in advance.

As the current collector, a material such as aluminum, nickel, and stainless steel which are generally used for a positive electrode of a lithium ion secondary cell may be used. As the conductive auxiliary agent, the same mentioned in the above-described negative electrode may be used.

As the electrolyte, an electrolytic solution obtained by dissolving lithium metal salt that is an electrolyte in an organic solvent may be used. The electrolytic solution is not particularly limited. As the organic solvent, an aprotic organic solvent, for example, one or more kinds of solvents, which are selected from propylene carbonate (PC), ethylene carbonate (EC), dimethyl carbonate (DMC), diethyl carbonate (DEC), ethyl methyl carbonate (EMC), fluoroethylene carbonate (FEC), and the, like may be used. In addition, as the electrolyte that is dissolved, a lithium metal salt, which is soluble in an organic solvent such as $LiPF_6$, $LiBF_4$, $LiAsF_6$, $LiI$, $NaPF_6$, $NaBF_4$, $NaAsF_6$, and LiBOB, may be used.

For example, a solution, which is obtained by dissolving a lithium metal salt such as $LiClO_4$, $LiPF_6$, $LiBF_4$, and $LiCF_3SO_3$ in an organic solvent such as ethylene carbonate, dimethyl carbonate, propylene carbonate, and dimethyl carbonate at a concentration of 0.5 mol/L to 1.7 mol/L, may be used.

The separator is not particularly limited as long as the separator may be used in a lithium ion secondary cell. The separator separates the positive electrode and the negative electrode from each other and retains the electrolytic solution, and as the separator, a thin microporous film formed from polyethylene and polypropylene may be used.

The shape of the lithium ion secondary cell of the invention is not particularly limited, and various shapes such as a cylinder type, a laminate type, and a coin type may be employed. In any shape, the separator is interposed between the positive electrode and the negative electrode to form an electrode body, and a positive electrode terminal and a negative electrode terminal, which lead to the outside from a positive electrode current collector and a negative electrode current collector, are connected to each other using a current collection lead and the like, and this resultant electrode body is hermetically sealed in a cell case together with the electrolytic solution, whereby a cell is obtained.

The secondary cell using the lithium manganese-based composite oxide of the invention described above as an active material may be appropriately used in a field of a vehicle in addition to a field of a communication apparatus such as a cellular phone and a PC, and a field of an information-related apparatus. For example, when being mounted in a vehicle, the secondary cell may be used as a power supply for an electric vehicle.

Hereinbefore, the embodiment of the negative-electrode active material for the lithium ion secondary cell of the invention has been described, but the invention is not limited to the above-described embodiment. The invention may be carried out in various aspects in which changes and modifications are made by those having ordinary skill in the art in a range not departing from the scope of the invention.

EXAMPLES

Hereinafter, the invention will be described in more detail with reference to examples.

<Manufacturing of Iron Oxide Powder>

$\alpha$-$Fe_2O_3$ was manufactured using $\alpha$-FeOOH powder composed of rod-shaped particles having an average length of 0.65 μm and an average diameter of 0.15 μm as a precursor. A heat treatment was carried out at a predetermined temperature in the air for 10 hours. A heat treatment temperature was set to 270° C., 360° C., 500° C., or 750° C.

Figure 2:
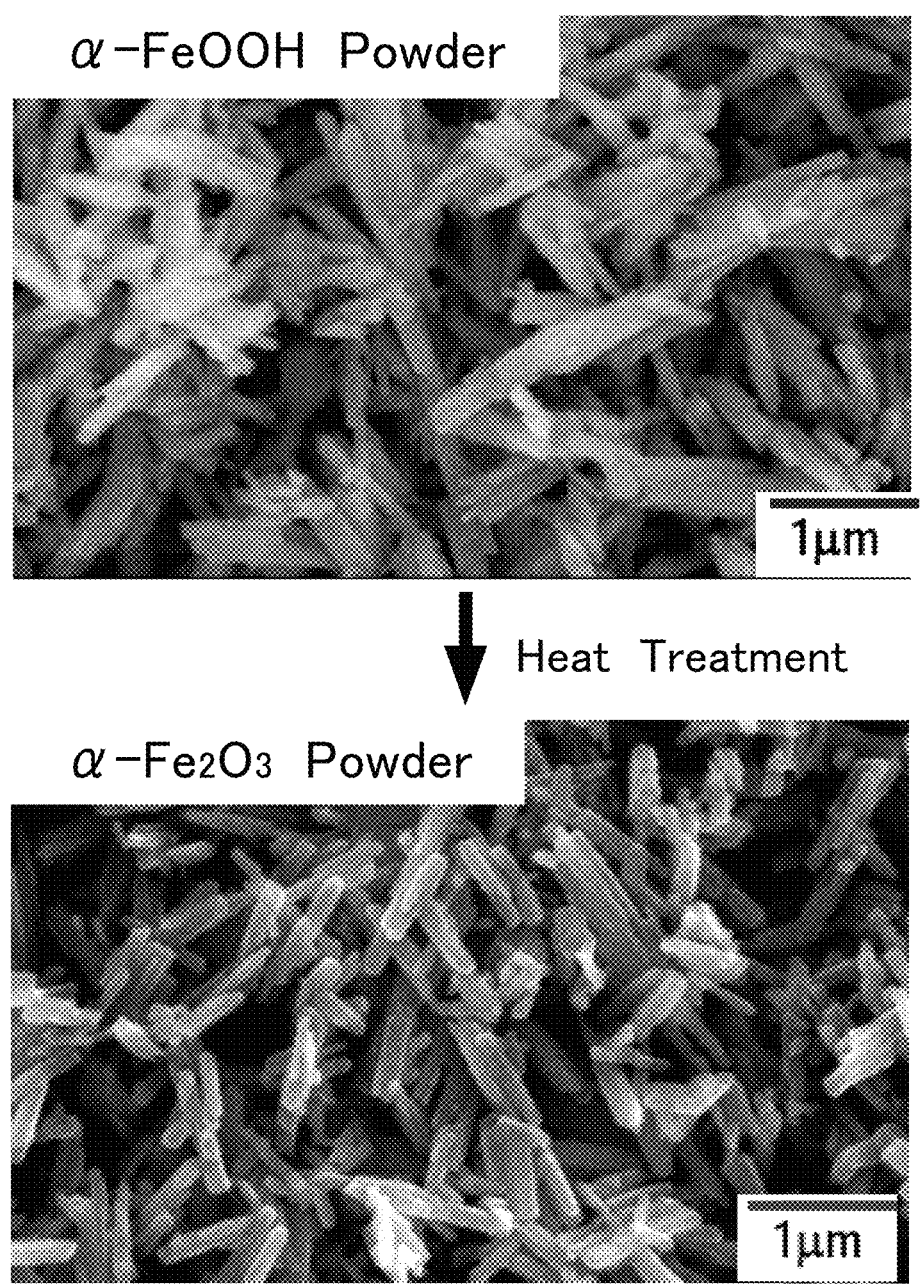
FIG. 2 illustrates a result obtained by observing the iron oxide powder used for the negative-electrode active material for the lithium ion secondary cell of the invention, and the precursor of the iron oxide powder using a scanning electron microscope (SEM)

X-ray diffraction (XRD) measurement using CuKα rays was carried out with respect to $\alpha$-FeOOH powder before and after the heat treatment. In addition, a shape was observed using scanning electron microscope (SEM). The results are illustrated in FIGS. 1 and 2. In addition, XRD patterns illustrated in FIG. 1, and SEM images illustrated in FIG. 2 represent results at a heat treatment temperature of 360° C. In addition, in FIG. 1, diffraction data of a powder diffraction file (PDF) of FeOOH and $\alpha$-$Fe_2O_3$ is also written.

From FIG. 1, it could be seen that $\alpha$-$Fe_2O_3$ powder was generated from $\alpha$-FeOOH powder by the heat treatment. In addition, from FIG. 2, it could be seen that an exterior shape did not vary before and after the heat treatment. Accordingly, even when measuring an average length and average diameter of the rod-shaped particles before and after the heat treatment, the average length was 0.65 μm, and the average diameter was 0.15 μm (an aspect ratio: 4.3).

In addition, the average length and the average diameter were set to values obtained by measuring lengths and diameters of a plurality of rod-shaped particles from an SEM image and averaging the lengths and diameters, respectively.

<Measurement of Specific Surface Area and Pore Volume>

Figure 3:
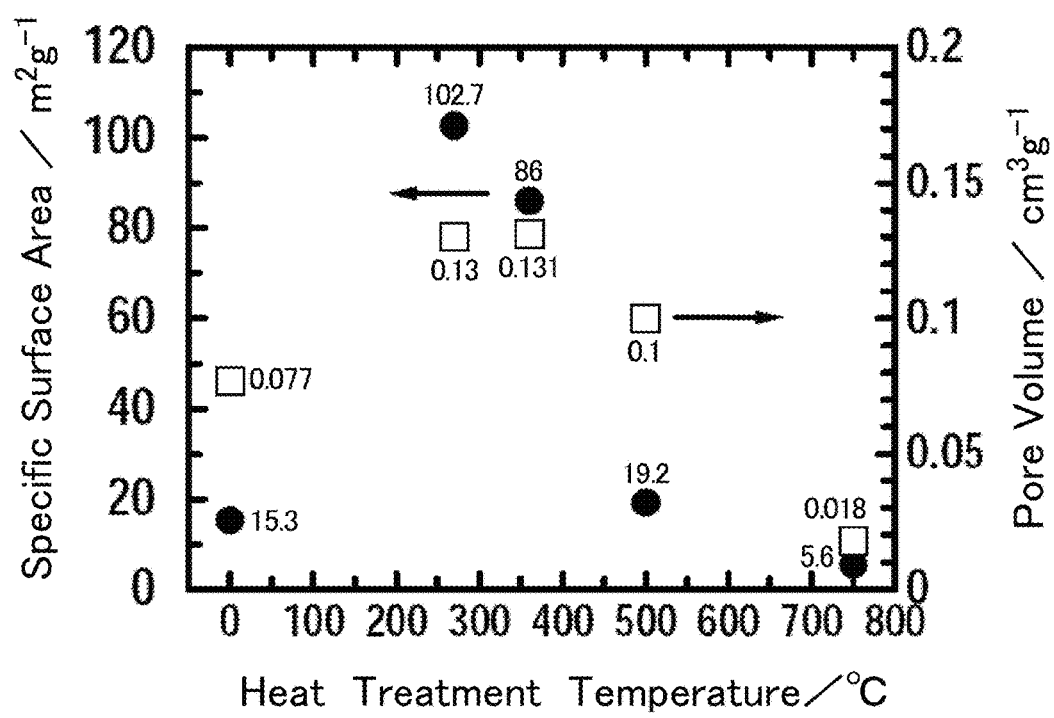
FIG. 3 is a graph illustrating a specific surface area and a pore volume of the iron oxide powder that is obtained by heat-treating the precursor at various temperatures.

A specific surface area and a pore volume of the $\alpha$-$Fe_2O_3$ powder, which was obtained by heat-treating the $\alpha$-FeOOH powder at various temperatures, were measured by using a BET method by low-temperature and low-humidity physical adsorption (an absorbate: nitrogen). The results are illustrated in FIG. 3. In FIG. 3, a value indicated by ● represents the specific surface area, and a value indicated by __ represents the pore volume. In addition, in FIG. 3, a measurement result of an untreated $\alpha$-FeOOH powder is indicated as a reference at a position in which a heat treatment temperature is "0° C."

From FIG. 3, from results in which the specific surface area and the pore volume increased due to heat treatment of the $\alpha$-FeOOH powder in comparison to a case before heat treatment, it could be seen that a plurality of pores formed by dehydration from a particle surface are present in the $\alpha$-$Fe_2O_3$ powder (particles) after the heat treatment. Particularly, the specific surface area and the pore volume of the $\alpha$-$Fe_2O_3$ powder, which was obtained after a heat treatment at 270° C. to 360° C., were as high as 80 $m^2/g$ or more and as high as 0.1 $cm^3/g$ or more. However, at a heat treatment temperature of 500° C. or higher, clogging of the pores occurred, and thus the specific surface area and the pore volume of the $\alpha$-$Fe_2O_3$ powder were equal to or less than the specific surface area and the pore volume of the $\alpha$-FeOOH powder before the heat treatment. It could be seen that the $\alpha$-$Fe_2O_3$ powder having high specific surface area and high pore volume could be obtained by selecting appropriate heat treatment conditions.

Preparation of Negative Electrode for Lithium Ion Secondary Cell

A negative electrode was prepared using the $\alpha$-$Fe_2O_3$ powder obtained by heat-treating the $\alpha$-FeOOH powder as an iron oxide powder at 360° C.

A powder in which a particle surface of commercially available $SiO_n$ powder (manufactured by Sigma-Aldrich Japan K.K., average particle size: 5 μm) was coated with carbon was used as a silicon oxide powder. The carbon coating was carried out in such a manner that the $SiO_n$ powder was added to an aqueous glucose solution, the resultant mixture was uniformly mixed, the mixture was dried, and the dried mixture was heat-treated at 900° C. for 2 hours. In addition, the $SiO_n$ was separated into two phases including a Si phase and a $SiO_2$ phase by an internal reaction of a solid due to the heat treatment. The Si phase that was obtained by the separation was very fine. In addition, in FIGS. 4 and 5, the silicon oxide powder is abbreviated as a SiO powder.

The silicon oxide powder and the iron oxide powder were mixed in a predetermined mixing ratio to obtain a mixed powder as a negative-electrode active material. 85 parts by mass of the mixed powder and 15 parts by mass of a binder (a solid content) were mixed with each other to prepare slurry. As the binder, a solution obtained by adding NMP to N-methylpyrrolidone (NMP) of commercially available polyamic acid was used. A solid content of the binder solution was 18% by mass. The slurry was applied onto a surface of electrolytic copper foil (current collector) having a thickness of 10 μm using a doctor blade to form a negative-electrode active material layer on the copper foil. Then, the current collector and the negative-electrode active material layer were brought into close contact and were strongly bonded by roll press machine. The resultant bonded product was vacuum-dried to form a negative electrode in which the thickness of the active material layer was approximately 30 μm.

In addition, a mixing ratio of the silicon oxide powder and the iron oxide powder was set to, in terms of a mass ratio, silicon oxide powder: iron oxide powder=100:0, 90:10, 80:20, 70:30, 60:40, 50:50, 20:80, 10:90, and 0:100, whereby nine kinds of negative electrodes which were different in a negative-electrode active material were prepared.

<Preparation of Lithium Ion Secondary Cell>

Nine kinds of lithium ion secondary cells (half cells) were prepared using the nine kinds of electrodes prepared in the above-described sequence as evaluation electrodes. A counter electrode was set to metal lithium foil (a thickness: 500 μm).

The counter electrode was cut to a size of φ15.5 mm, each of the evaluation electrodes was cut to a size of φ15.0 mm, and a separator (formed from polyethylene porous film, a thickness: 25 μm) was interposed between the counter electrode and the evaluation electrode to prepare an electrode body cell. The electrode body cell was accommodated in a cell case (CR2032 coin cell manufactured by Hohsen Corp.). In addition, an non-aqueous electrolyte, which was obtained by dissolving $LiPF_6$ in a mixed solvent in which ethylene carbonate (EC) and ethyl methyl carbonate (EMC) were mixed in a volume ratio of EC:EMC=3:7 in a concentration of 1 $mol/dm^3$, was injected into the cell case, and the cell case was hermetically sealed, thereby obtaining a lithium ion secondary cell.

Charge and Discharge Test

A charge and discharge test was carried out with respect to each lithium ion secondary cell that was prepared at room temperature.

A constant current charge and discharge test was carried out with a charge and discharge current density of 0.2 $mA/cm^2$ at the first cycle and with a charge and discharge current density of 0.5 $mA/cm^2$ at the second cycle. A potential range was set to 0 V to 3.0 V in terms of a lithium reference potential.

Figure 4:
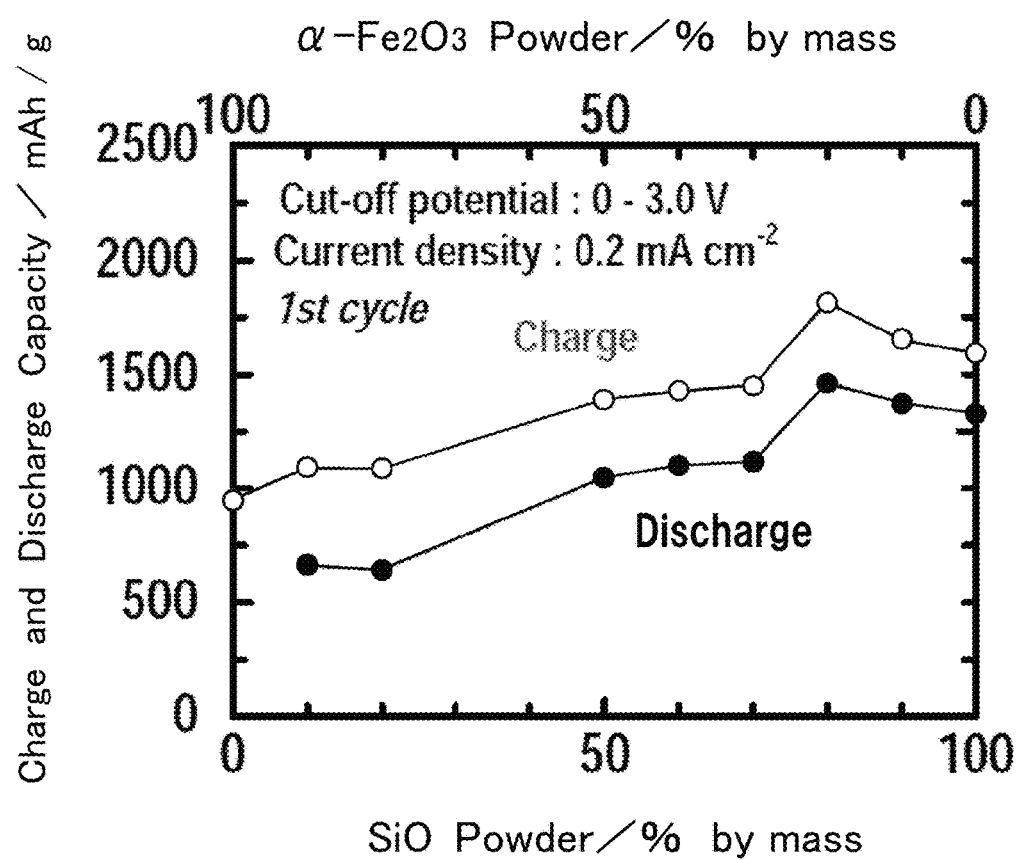
FIG. 4 is a graph illustrating an initial charge and discharge capacity of the lithium ion secondary cell using various kinds of negative-electrode active materials, which have compositions different from each other, for the lithium ion secondary cell.

Charge and discharge capacity and discharge capacity at the first cycle are illustrated in FIG. 4. In addition, transition of the discharge capacity up to 70 cycles is illustrated in FIG. 5.

From FIG. 4, it could be seen that as the mixing ratio of the silicon oxide powder increased, initial capacity had a tendency to increase. Particularly, when the mixing ratio of the silicon oxide powder was 80% by mass, the capacity became the maximum. When the mixing ratio of the silicon oxide powder was set to 75% by mass to 90% by mass (an added amount of the iron oxide powder was 10% by mass to 25% by mass), it could be seen that the initial capacity could be increased compared to a case in which the iron oxide powder was not contained.

Figure 5:
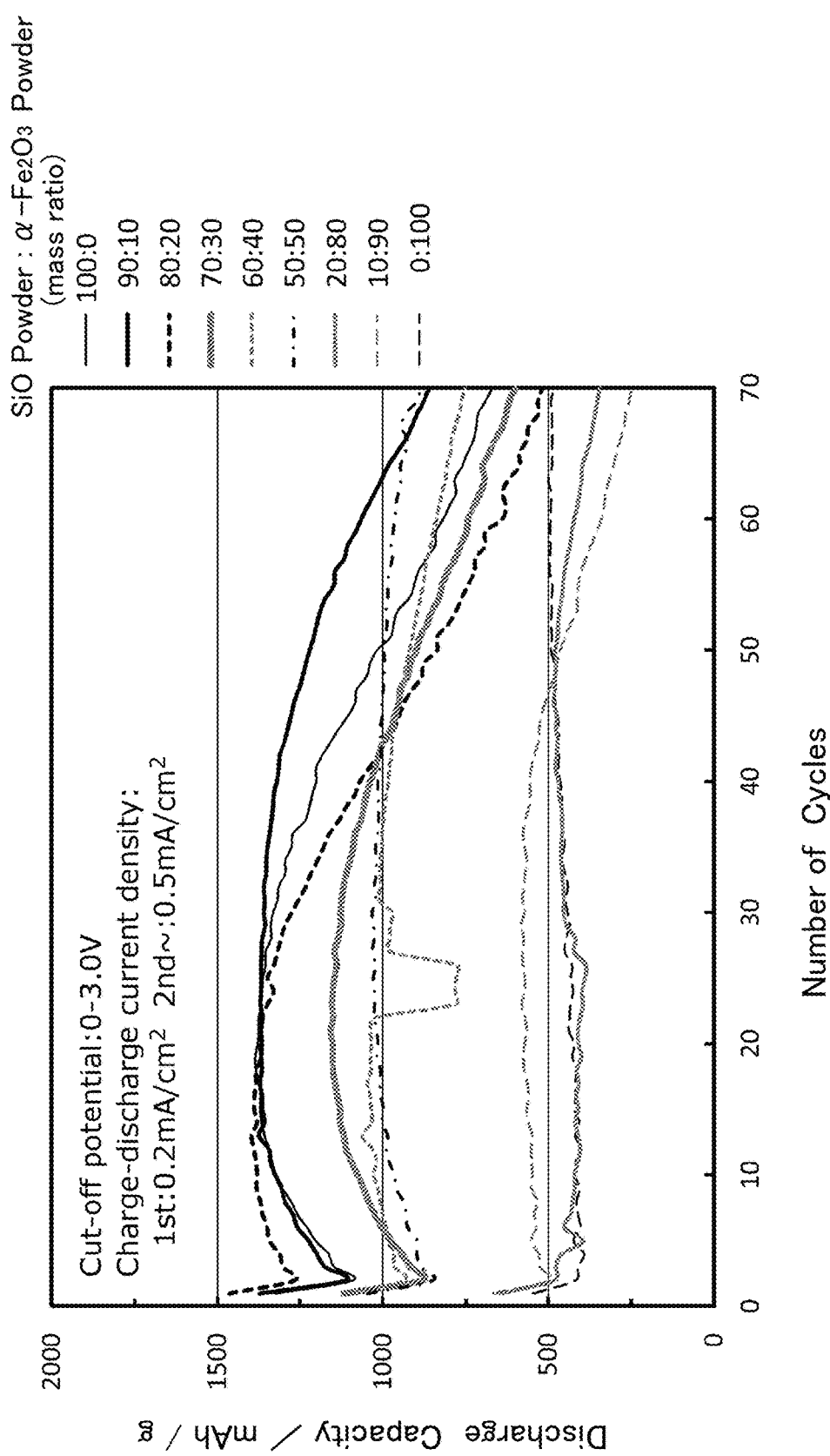
FIG. 5 is a graph illustrating cycle characteristics of the lithium ion secondary cell using various kinds of negative-electrode active materials, which have compositions different from each other, for the lithium ion secondary cell.

From FIG. 5, it could be seen that a decrease in the discharge capacity along with an increase in the number of cycles could be suppressed due to use of the iron oxide powder. When the added amount of the iron oxide powder was set to 40% by mass or more, the cycle transition of the discharge capacity became very stable. On the other hand, in a case of a second cell in which the added amount of the iron oxide powder was 10% by mass, it could be seen that the initial capacity and cycle characteristics were more excellent than a second cell in which the negative-electrode active material was composed of 100% by mass of silicon oxide powder. In other words, when the added amount of the iron oxide powder was set to 5% by mass to 15% by mass (a mixing ratio of the silicon oxide powder was 85% by mass to 95% by mass), it could be seen that a lithium ion secondary cell, in which the initial capacity and the cycle characteristics were compatible with each other at a high level, could be obtained.

Reference Example: Comparison of Particle Shape of α-$Fe_2O_3$ Powder

Two kinds of negative electrodes were prepared using a rod-shaped iron oxide powder or a spherical iron oxide powder. As the rod-shaped iron oxide powder, α-$Fe_2O_3$ powder (an average length: 0.65 μm, and an average diameter: 0.15 μm) (an aspect ratio: 4.3), which was obtained by heat-treating the α-FeOOH powder at 360° C., was used. As the spherical iron oxide powder, commercially available α-$Fe_2O_3$ powder (an average particle size: 0.7 μm (an aspect ratio was approximately 1) was used.

85 parts by mass of the rod-shaped α-$Fe_2O_3$ powder or the spherical α-$Fe_2O_3$ powder, 5 parts by mass of acetylene black (AB), and 10 parts by mass of a binder were mixed to prepare slurry. As the binder, a solution obtained by adding NMP to N-methylpyrrolidone (NMP) of commercially available polyamic acid was used. A solid content of the binder solution was 30% by mass. The slurry was applied onto a surface of electrolytic copper foil (current collector) having a thickness of 10 μm using a doctor blade to form a negative-electrode active material layer on the copper foil. Then, the current collector and the negative-electrode active material layer were brought into close contact and were strongly bonded by roll press machine. The resultant bonded product was vacuum-dried to form a negative electrode in which the thickness of the active material layer was approximately 30 μm.

Figure 6:
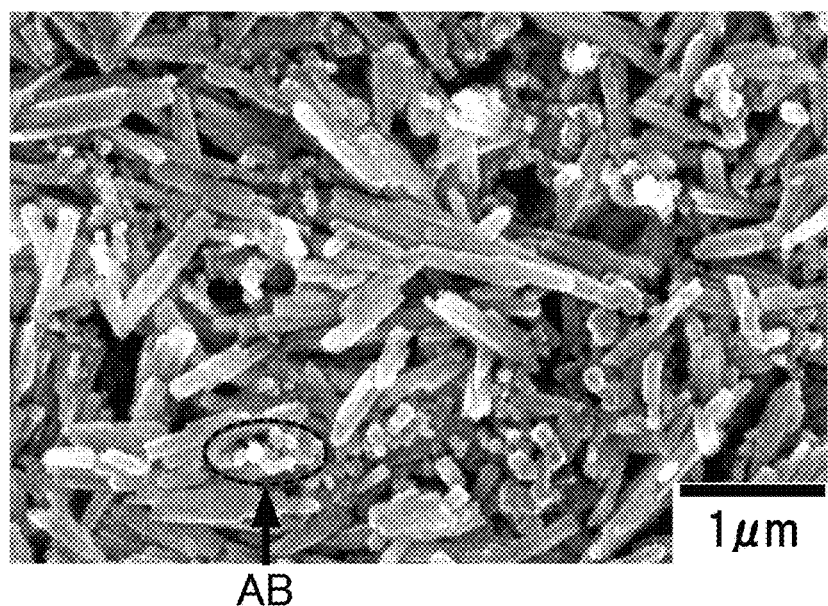
FIG. 6 illustrates a result obtained by observing the iron oxide powder used for the negative-electrode active material for the lithium ion secondary cell of the invention using the SEM.
Figure 7:
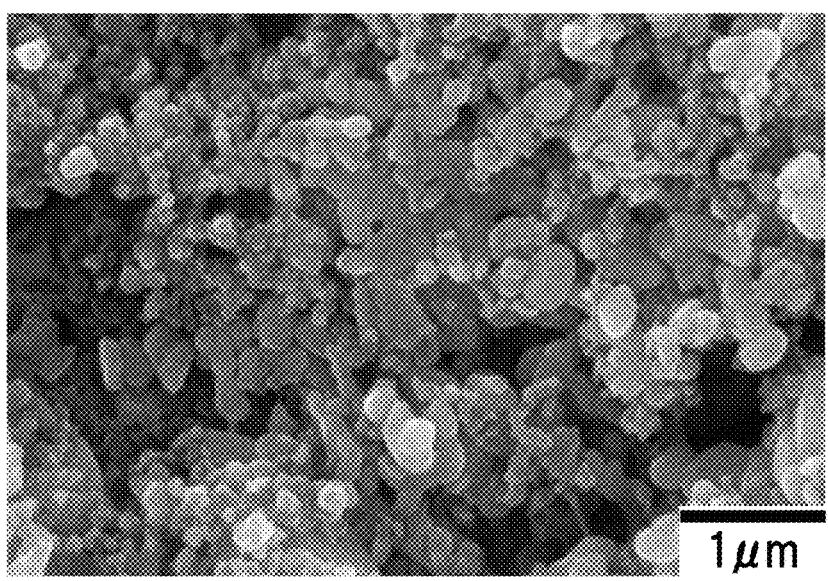
FIG. 7 illustrates a result obtained by observing a spherical iron oxide powder used for a negative-electrode active material for the lithium ion secondary cell of the related art using the SEM.

The results obtained by observing the negative-electrode active material layer by SEM are illustrated in FIGS. 6 and 7. A granular material illustrated in FIG. 6 (an example is indicated by an arrow) was acetylene black. The SEM observation was carried out with respect to a surface of the negative-electrode active material layer in a direction perpendicular to a surface of the current collector. In FIG. 6, a plurality of rod-shaped particles parallel with the surface of the current collector was observed.

Two kinds of lithium ion secondary cells (half cells) were prepared in the above-described sequence using the two kinds of electrodes prepared in the above-described sequence as evaluation electrodes. A charge and discharge test was carried out with respect to each lithium ion secondary cell that was prepared at room temperature.

A constant current charge and discharge test was carried out with a charge and discharge current density of 0.2 $mA/cm^2$ at the first cycle and with a charge and discharge current density of 0.5 $mA/cm^2$ at the second cycle. A potential range was set to 0.005 V to 3.0 V in terms of a lithium reference potential.

Transition of the discharge capacity from the first cycle to $18^{th}$ cycle ($20^{th}$ cycle in a case of using the spherical α-$Fe_2O_3$ powder) is illustrated in FIG. 8. In the secondary cell using the rod-shaped α-$Fe_2O_3$ powder, 85% or more of initial discharge capacity was maintained up to $18^{th}$ cycle. In addition, in a secondary cell using the rod-shaped α-$Fe_2O_3$ powder, the discharge capacity was as high as 700 mAh/g even after the second cycle. On the other hand, in a secondary cell using the spherical α-$Fe_2O_3$ powder, the initial discharge capacity was low and decreased to approximately the half of the initial discharge capacity at the second cycle, and the discharge capacity further decreased to approximately the half at the $20^{th}$ cycle.

In the two kinds of secondary cells used for the above-described evaluation, a difference other than the particle shape was not present. Accordingly, it could be seen that the high capacity and the excellent cycle characteristics of the secondary cell using the rod-shaped α-$Fe_2O_3$ powder were caused by the particle shape. In addition, when the rod-shaped α-$Fe_2O_3$ powder was used in combination with the silicon oxide powder, as illustrated in FIGS. 4 and 5, it could be seen that the cycle characteristics and the initial capacity which were not sufficient in the silicon oxide powder alone may be improved. On the other hand, when using the spherical α-$Fe_2O_3$ powder in combination with the silicon oxide powder, it is predicted that the cycle characteristics and the initial capacity get worse compared to a case of using the silicon oxide powder alone due to an effect of the spherical $\alpha$-$Fe_2O_3$ powder.

The invention claimed is:

1. A lithium ion secondary cell, comprising:
a negative electrode;
a positive electrode; and
an electrolytic solution,
wherein the negative electrode includes a current collector and a negative-electrode active material layer bound onto the current collector and including a negative-electrode active material and a binding agent, and
the negative-electrode active material includes a mixed material of silicon oxide particles which are composed of silicon oxide, and rod-shaped iron oxide particles which are composed of iron oxide,
wherein the rod-shaped iron oxide particles are disposed in parallel with a surface of the current collector,
the average particle diameter of the silicon oxide particles is in a range of 5 μm to 20 μm,
the iron oxide particles have an average length of 0.4 μm to 0.7 μm and an average diameter of 0.085 μm to 0.17 μm, and
when the entirety of the mixed material is set to 100% by mass, 5% by mass to 25% by mass of the iron oxide particles are included.

2. The lithium ion secondary cell according to claim 1, wherein the iron oxide particles have a plurality of pores in a surface thereof.

3. The lithium ion secondary cell according to claim 1, wherein the iron oxide particles have an aspect ratio of 2 to 10.

4. The lithium ion secondary cell according to claim 1, wherein the iron oxide particles include $\alpha$-$Fe_2O_3$.

5. The lithium ion secondary cell according to claim 1, wherein the pores of the iron oxide particles are formed by a dehydration reaction due to thermal decomposition of FeOOH.

6. The lithium ion secondary cell according to a claim 1, wherein the silicon oxide particles contain a $SiO_2$ phase and a Si phase, and an oxide-based compound which is expressed by $Li_xSi_yO_z$ ($0 \leq x \leq 4$, $0.3 \leq y \leq 1.6$, and $2 \leq z \leq 4$) is included in the $SiO_2$ phase.

7. The lithium ion secondary cell according to claim 1, wherein the silicon oxide particles include a coating layer formed from a carbon material on a surface.

8. The lithium ion secondary cell according to claim 1, wherein when the entirety of the mixed material is set to 100% by mass, 5% by mass to 15% by mass of the iron oxide particles are included.

9. The lithium ion secondary cell according to claim 1, wherein a specific surface area of the iron oxide particles is 30 $m^2/g$ to 1000 $m^2/g$.

10. The lithium ion secondary cell according to claim 1, wherein a pore volume of the iron oxide particles is 0.08 $cm^3/g$ to 1.0 $cm^3/g$.

* * * * *